US011425001B2

(12) United States Patent
Chandrashekar (10) Patent No.: US 11,425,001 B2
(45) Date of Patent: Aug. 23, 2022

(54) NODE ADDITION IN CLOUD NETWORKS

(71) Applicant: Hewlett Packard Enterprise Development LP, Houston, TX (US)

(72) Inventor: Charan Acharya Chandrashekar, Bangalore Karnataka (IN)

(73) Assignee: Hewlett Packard Enterprise Development LP, Houston, TX (US)

(*) Notice: Subject to any disclaimer, the term of this patent is extended or adjusted under 35 U.S.C. 154(b) by 95 days.

(21) Appl. No.: 16/444,896

(22) Filed: Jun. 18, 2019

(65) Prior Publication Data
US 2020/0403886 A1    Dec. 24, 2020

(51) Int. Cl.
*H04L 41/5041*    (2022.01)
*H04L 9/40*    (2022.01)

(52) U.S. Cl.
CPC .......... *H04L 41/5048* (2013.01); *H04L 63/08* (2013.01)

(58) Field of Classification Search
CPC ............................ H04L 41/5048; H04L 63/08
See application file for complete search history.

(56) References Cited

U.S. PATENT DOCUMENTS

| 2003/0076808 | A1* | 4/2003 | McNiff | H04W 8/02 370/345 |
| 2012/0311106 | A1* | 12/2012 | Morgan | G06F 9/45558 709/220 |
| 2013/0067550 | A1* | 3/2013 | Chen | H04L 63/08 726/7 |
| 2014/0280522 | A1* | 9/2014 | Watte | H04L 51/18 709/203 |
| 2014/0280806 | A1* | 9/2014 | Washburn | G06F 15/177 709/222 |
| 2014/0310039 | A1* | 10/2014 | Casey | G06Q 30/0635 705/7.13 |

(Continued)

FOREIGN PATENT DOCUMENTS

WO    WO-2013039793    3/2013

OTHER PUBLICATIONS

Rosendahl, H.; "OpenStack's New Peacemaker to Quarrelsome Multi-Vendor Cloud Management"; Mar. 15, 2016; 3 pages.

(Continued)

*Primary Examiner* — John A Follansbee
*Assistant Examiner* — Raqiul A Choudhury
(74) *Attorney, Agent, or Firm* — Jaffery Watson Mendonsa & Hamilton (57) ABSTRACT

Example techniques of addition of nodes in cloud networks managed by a multi-cloud management platform, are described. In an example, a node addition request is received at a multi-cloud management platform. The node addition request includes identification information of a node and a cloud network in which the node is to be added. The identification information is indicative of a functionality of the node, a network address of the node, and an identifier of the cloud network. Based on the identifier of the cloud network, cloud account details of the cloud network may be obtained from one of the multi-cloud management platform and a user input. A controller node of the cloud network may be accessed based on the cloud account details. The node may be registered at the controller node of the cloud network, based on the identification information of the node and the cloud network.

17 Claims, 6 Drawing Sheets

(56) References Cited

U.S. PATENT DOCUMENTS

| | | |
|---|---|---|
| 2015/0066599 A1 | 3/2015 | Naseh et al. |
| 2015/0188927 A1 | 7/2015 | Santhi et al. |
| 2016/0050326 A1* | 2/2016 | Lee .................... H04N 1/00244 |
| | | 358/402 |
| 2016/0323382 A1* | 11/2016 | Perreira ................ H04L 67/325 |
| 2018/0069804 A1 | 3/2018 | Laplanche et al. |
| 2019/0132932 A1* | 5/2019 | Klecha ................... H05B 47/19 |
| 2020/0092166 A1* | 3/2020 | Sharma ............... G06F 21/6218 |

OTHER PUBLICATIONS

Turol, S. et al.; "An MSP Provider Builds a Cross-IaaS Management Platform with IBM Bluemix"; Mar. 10, 2017; 11 pages.

BMC, "BMC Multi-Cloud Management Solutions", Oct. 2017, 2 pages.

Cisco, "Cisco HyperFlex Multicloud Platform", Solution brief, Jan. 2018, 4 pages.

Ferranti, M., "Juniper mufticloud management software targets enterprise data centers", Network World, retrieved from internet: https://www.networkworld.com/article/3259310/juniper-multicloud-management-software-targets-enterprise-data-centers.html, Apr. 25, 2018, 4 pages.

Hewlett Packard Enterprise, "HPE Unveils Industry's First SaaS-Based Multi-Cloud Management Solution for On-Premises and Public Clouds", retrieved from internet at <https://www.hpe.com/us/en/newsroom/press-release/2017/11/hpe-unveils-industrys-first-saas-based-multi-cloud-management-solution-for-on-premises-and-public-clouds.html>, Nov. 28, 2018, 9 pages.

Rightscale, "RightScale Cloud Management Platform", Sep. 2018, 6 pages.

\* cited by examiner

SYSTEM 100

PROCESSOR(S) 102

MEMORY 104

[[GENERATE A LIST OF A PLURALITY OF CLOUD NETWORKS MANAGED BY A MULTI-CLOUD MANAGEMENT PLATFORM;

RECEIVE A NODE ADDITION REQUEST AT THE MULTI-CLOUD MANAGEMENT PLATFORM, THE NODE ADDITION REQUEST INCLUDING IDENTIFICATION INFORMATION OF A NODE AND A CLOUD NETWORK, IN WHICH THE NODE IS TO BE ADDED, THE IDENTIFICATION INFORMATION BEING INDICATIVE OF A FUNCTIONALITY OF THE NODE, A NETWORK ADDRESS OF THE NODE, AND AN IDENTIFIER OF THE CLOUD NETWORK;

INSTALL AN OPERATING SYSTEM (OS) IN THE NODE BASED ON THE IDENTIFICATION INFORMATION OF THE NODE AND THE CLOUD NETWORK, IN RESPONSE TO IDENTIFYING THAT THE OS IS NOT PRE-INSTALLED IN THE NODE;

OBTAIN, BASED ON THE IDENTIFIER OF THE CLOUD NETWORK, CLOUD ACCOUNT DETAILS OF THE CLOUD NETWORK FROM ONE OF THE MULTI-CLOUD MANAGEMENT PLATFORM AND A USER INPUT;

ACCESS A CONTROLLER NODE OF THE CLOUD NETWORK BASED ON THE CLOUD ACCOUNT DETAILS; AND

REGISTER THE NODE AT THE CONTROLLER NODE OF THE CLOUD NETWORK, BASED ON THE IDENTIFICATION INFORMATION OF THE NODE AND THE CLOUD NETWORK. ]]

NODE ADDITION IN CLOUD NETWORKS

BACKGROUND

A cloud network enables communication between components in a cloud computing infrastructure and external users, applications, or services. Resources and operations of the cloud network are facilitated by the cloud computing infrastructure. A cloud network can enable connection between a remote user and a cloud application (Software as a Service) or a remote user and a cloud infrastructure (Infrastructure as a Service).

Multiple cloud networks and storage resources may be grouped in a single heterogeneous architecture referred to as a multi-cloud environment. In the multi-cloud environment, cloud assets, software, applications, etc., may be distributed across several cloud networks. The multi-cloud environment may include cloud networks or cloud hosting environments provided by different cloud service providers. In the multi-cloud environment, the cloud networks may be managed by a multi-could management platform. The multi-cloud management platform includes hardware, software, firmware, or a combination thereof which provides a unified interface for deployment, provisioning, and monitoring of different cloud networks in the multi-cloud environment.

BRIEF DESCRIPTION OF DRAWINGS

The following detailed description references the drawings, wherein.

DETAILED DESCRIPTION

A cloud network may include physical computing resources which may act as host systems, also called nodes. A node may be a compute node or a controller node depending upon its functions. A compute node may deploy a hypervisor to enable multiple virtual machines (VMs) to be run on a single compute node. The compute node may thus provide storage, networking, memory, and processing resources that can be consumed by virtual machines (VMs) hosted by the compute node. A hypervisor or a virtual machine monitor (VMM) includes a computer software, firmware, hardware, or a combination thereof that can create and run VMs. Each VM running on the hypervisor can execute its own operating system and can be associated with a certain section of the storage pool. Each VM may run different applications and services. The hypervisor provides a virtual operating platform for the VMs, manages execution of the operating systems of the VMs, and enables sharing of virtualized hardware resources of the compute node among the VMs, such that different operating systems of different VMs can run on a single compute node. A controller node generally hosts shared cloud services and other tools. The Controller node supplies Application Programming Interfaces (APIs), scheduling tools, a web interfaces, message queues, and database servers of the cloud network. The controller node may maintain a datastore containing identification information of compute nodes registered in a cloud network and managed by the controller node. The controller node manages non-compute services, such as scheduling, data storage, image storage, etc., of the cloud network. The cloud network may also include a storage pool formed of multiple storage systems which are part of the cloud network.

Multiple cloud networks/cloud hosting environments in the multi-cloud environment may be managed by a multi-cloud management platform. The multi-cloud management platform managing a cloud network may collect data associated with the cloud network. The data may be related to user authentication details, processing resource usage, memory capacity usage, implementation policies, cloud logs, events, such as creation of workload, provisioning of resources, etc. of the cloud network.

In order to add a node under a cloud network managed by a multi-cloud management platform, a network administrator, also referred to as an admin, generally logs into the cloud network by providing cloud account details for authentication. After logging in into the cloud network, the admin performs a series of steps for registering the node in the cloud network.

Consider a scenario, in which multiple cloud networks are registered under a multi-cloud management platform. For adding a node in each of the multiple cloud networks, the admin logs in into each of the cloud networks and performs the series of respective steps for adding a node in the cloud networks. In an example, the cloud networks registered under the multi-cloud management platform, may be hosted by different cloud service providers and the steps involved in adding a node in each of such cloud networks may be different. Thus, considerable manual effort of the admin may be consumed in individually logging in into each of the cloud networks and then performing a respective set of steps for addition of a node in each of the cloud networks. Also, in a scenario where a node is to be added in all cloud networks managed by the multi-cloud management platform, logging in into each cloud network and performing the steps for addition of a node may be cumbersome and time consuming.

The present disclosure describes approaches in which, a node may be added to a cloud network managed by a multi-cloud management platform without logging in into the cloud network in which the node is added. Further, according to the methods and systems of the present disclosure, the node may be added in the cloud network without the admin separately invoking each of the steps involved in addition of the node in the cloud network.

The present disclosure relates to addition of nodes in cloud networks managed by a multi-cloud management platform without logging in into the individual cloud networks. In the present disclosure, addition of a node in a cloud network refers to configuring a node for being registered under the cloud network. Physical connections between computing resources of the node and computing resources previously registered as a part of the cloud network are ensured in prior.

According to the present disclosure, a node addition request may be received at a multi-cloud management platform. The multi-cloud management platform manages a plurality of cloud networks. The node addition request includes identification information of a node and a cloud network, amongst the plurality of cloud networks, in which the node is to be added. The identification information is indicative of a functionality of the node, a network address of the node, and an identifier of the cloud network. In an example, the functionality of the node may be indicated by a type of the node which is to be added. The type of the node may be predefined by a network administrator in the node addition request. Examples of the type of the node may be one of a compute node and a controller node. A compute node may be configured to run multiple VMs managed by a hypervisor. A controller node may be configured to provide shared services of the cloud network, such as provide APIs, scheduling services, web interfaces, message queues, and database servers. Thus, the controller node manages non-compute services of the cloud network. The network address of the node may be an IP address or MAC address of the node as specified by the admin. The identifier of the cloud network may be an unique identifier such as GUID of the cloud network.

In response to the node addition request being received, cloud account details of the cloud network may be obtained from one of the multi-cloud management platform and a user input, based on the identifier of the cloud network. The cloud account details is indicative of data for authentication of a user account that controls access to computing resources of the cloud network. Further, a controller node of the cloud network is accessed based on the cloud account details and the node is registered at the controller node of the cloud network, based on the identification information of the node and the cloud network.

Thus, in accordance with the present disclosure, nodes may be added in multiple cloud networks managed by a multi-cloud management platform, collectively, without individually logging in into each of the cloud networks. Thus, the network administrator's manual efforts in identifying each of the multiple cloud networks, logging in into each of the individual cloud networks, and performing the respective steps for node addition individually in each of such cloud networks, may be reduced. Consequently, complexity and manual effort in adding nodes in multiple cloud networks managed by a multi-cloud management platform may be reduced. As a result, cloud networks managed by the multi-cloud management platform may be horizontally scaled up in a simpler manner.

The following detailed description refers to the accompanying drawings. Wherever possible, the same reference numbers are used in the drawings and the following description to refer to the same or similar parts. While several examples are described in the description, modifications, adaptations, and other implementations are possible. Accordingly, the following detailed description does not limit the disclosed examples. Instead, the proper scope of the disclosed examples may be defined by the appended claims.

Figure 1:
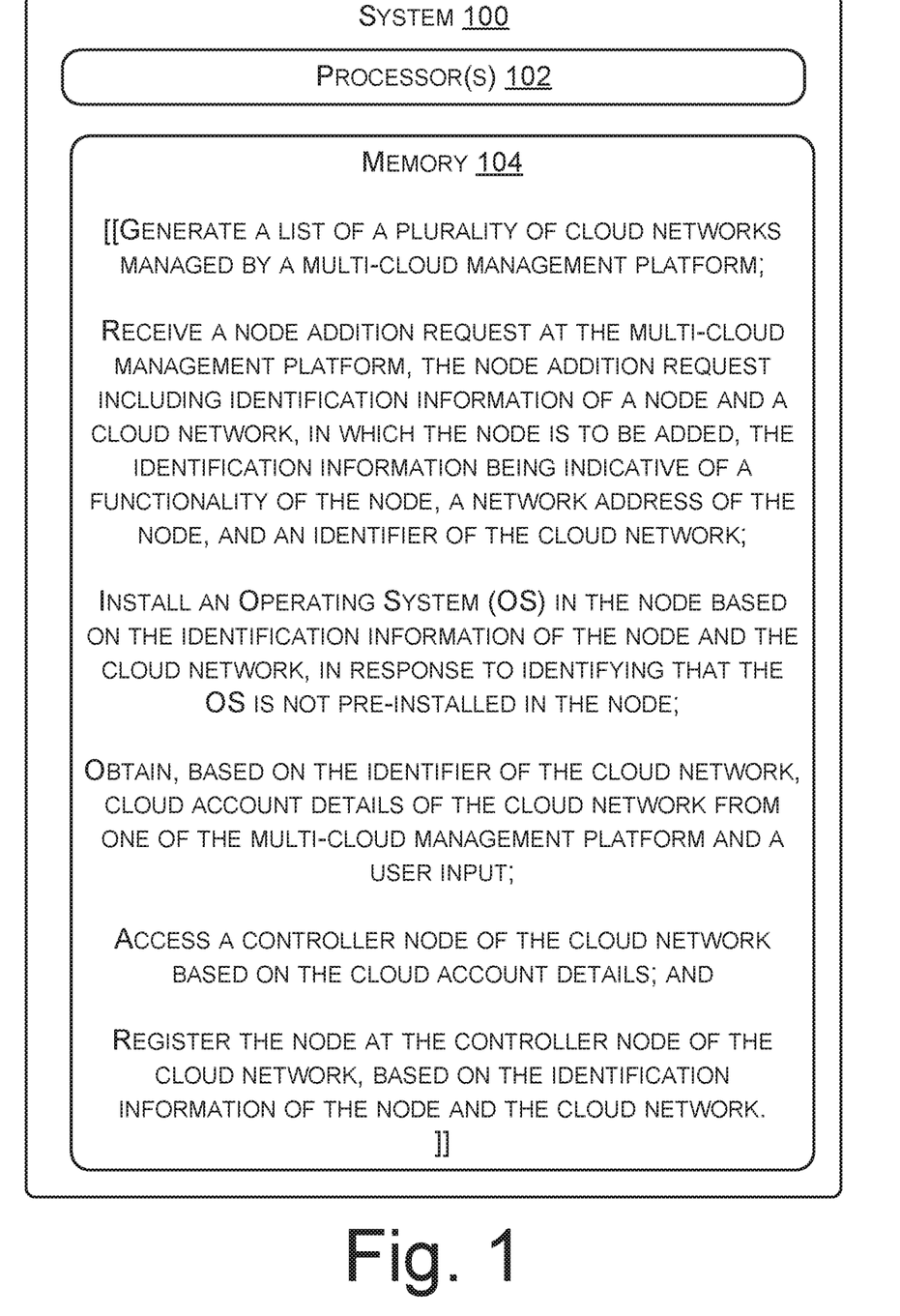
FIG. 1 illustrates a system for addition of nodes in a cloud network managed by a multi-cloud management platform, according to an example.

FIG. 1 illustrates a system 100 for addition of nodes in a cloud network managed by a multi-cloud management platform, according to an example. The system 100 may be an electronic device, such as a desktop, a laptop, a tablet, a handheld device, etc., capable of processing computer readable instructions. In an example, the system 100 may be a computer running a multi-cloud management platform in a multi-cloud environment. In an example, the multi-cloud management platform may be a hybrid cloud management solution implemented through a Software-as-a-Service (SaaS) portal.

The system 100 includes a processor 102 and a memory 104 coupled to the processor 102. The memory 104 stores instructions executable by the processor 102. In an example, the instructions when executed by the processor cause the processor to implement the multi-cloud management platform in a multi-cloud environment. The instructions when executed by the processor 102 cause the processor 102 to generate a list of a plurality of cloud networks managed by the multi-cloud management platform. In an example, the list of the plurality of cloud networks may be populated in a Graphical User Interface (GUI). The instructions when executed by the processor 102 cause the processor 102 to receive a node addition request from a network administrator. In an example, the node addition request may be received through the GUI or a Command Line Interface (CLI) of the multi-cloud management platform. The node addition request includes identification information of a node and a cloud network in which the node is to be added. The identification information is indicative of a functionality of the node, a network address of the node, and an identifier of the cloud network. In an example, the identification information may include a node type indicating the functionality of the node. The node type may be one of a compute node and a controller node. In an example, the admin may define the node type of the node to be added. The network address of the node may be one of an Internet Protocol (IP) address of the node, a Media Access Control (MAC) address of the node, an IP address of a Baseboard Management Controller of the node, and a combination thereof. The identifier of the cloud network may be a name, a Globally Unique Identifier (GUID), or a combination thereof.

The instructions when executed by the processor 102 further cause the processor 102 to install an Operating System (OS) in the node based on the identification information of the node and the cloud network, in response to identifying that the OS is not pre-installed in the node. The instructions when executed by the processor 102 further cause the processor 102 to obtain, based on the identifier of the cloud network, cloud account details of the cloud network from one of the multi-cloud management platform and a user input. The cloud account details is indicative of data for authentication of a user account that controls access to computing resources of the cloud network. In an example, the cloud account details may include a username and password. In an example, the cloud account details may be stored in the multi-cloud management platform. In another example, the instructions when executed by the processor 102 cause the processor 102 to request for the cloud account details from the admin. An admin may provide a user input defining the cloud account details.

The instructions when executed by the processor 102 further cause the processor 102 to access a controller node of the cloud network based on the cloud account details. The controller node manages non-compute services of the cloud network. The controller node is configured to manage Application Programming Interfaces (APIs), web interfaces, schedulers, database servers, and message queues of the cloud network. The instructions when executed by the processor 102 further cause the processor 102 to register the node at the controller node of the cloud network, based on the identification information of the node and the cloud network.

Since, according to the present disclosure, the node is registered under the cloud network without individually logging in into the cloud network and without manually performing the steps for registering the node, therefore, the node may be added in a simpler manner with reduced manual effort. Consequently, the management platform may be utilized for addition of nodes in the cloud networks managed by the multi-cloud management platform, thereby enabling horizontal scaling up of the cloud networks, collectively.

Figure 2:
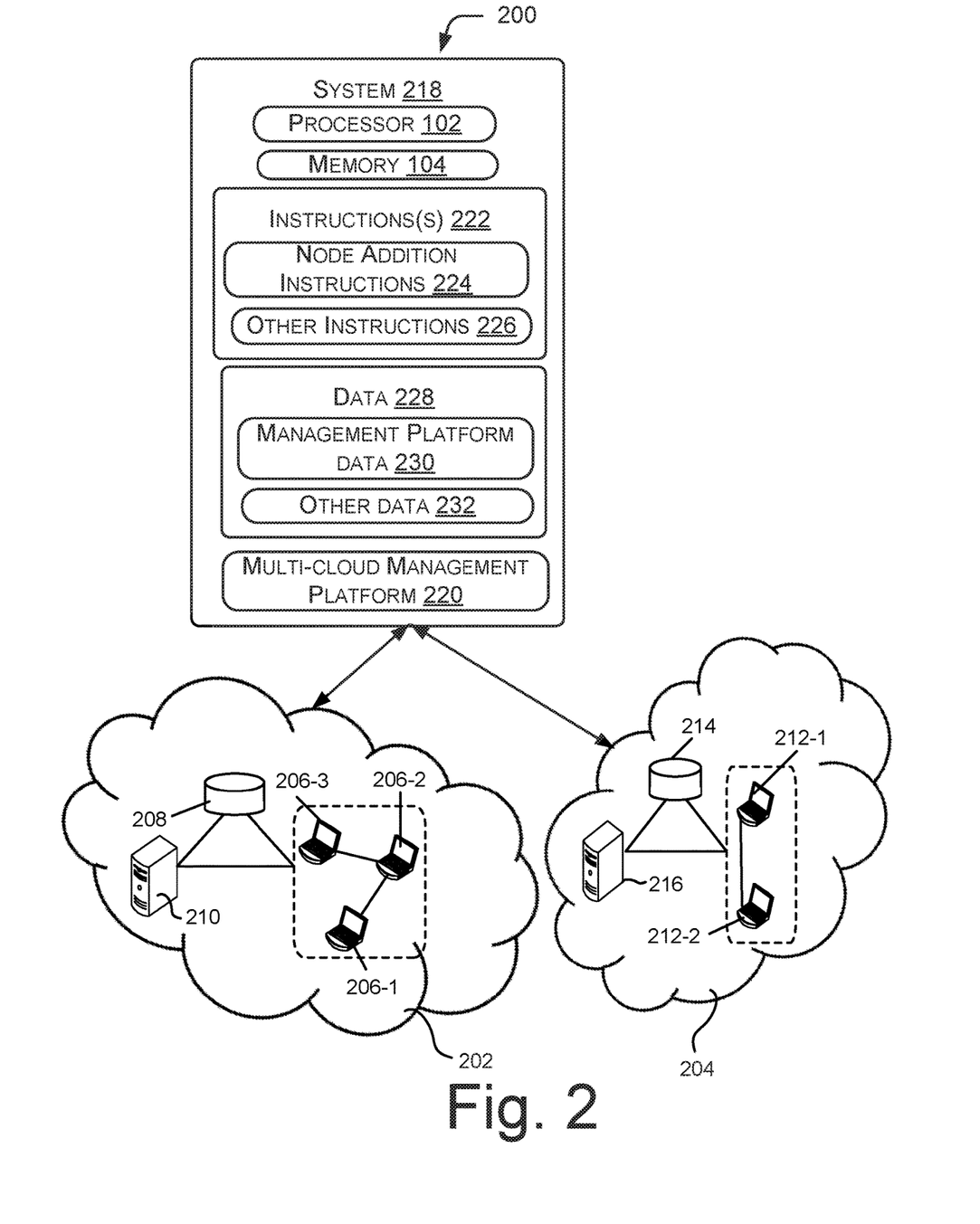
FIG. 2 illustrates a multi-cloud environment, according to an example.

FIG. 2 illustrates a multi-cloud environment 200 according to an example of the present subject matter. The multi-cloud environment 200 includes a first cloud network 202 and a second cloud network 204. The first and second cloud networks 202 and 204 have cloud hosting capabilities. In an example, the first cloud network 202 may be provided by a first cloud service provider and the second cloud network 204 may be provided by a second cloud service provider. In an example, the first and second cloud networks 202 and 204 may be one of a public cloud, a private cloud, and a hybrid cloud. In an example, the first and second cloud networks 202 and 204 may be an Infrastructure as a Service (IaaS) cloud.

As shown in FIG. 2, the first cloud network 202 includes compute nodes 206-1, 206-2, and 206-3, collectively referred to as compute nodes 206. Although, the first cloud network 202 is shown to include three compute nodes there may be more than three or less than three compute nodes in the first cloud network 202. The first cloud network 202 further includes a data storage device 208. Each of the compute nodes 206 may have a respective storage volume of the data storage device 208 associated with it. Although, the first cloud network 202 is shown to include one data storage device, there may be more than one data storage devices in the first cloud network 202. The first cloud network 202 also includes a controller node 210 that can manage operations of the compute nodes 206 in the first cloud network 202. The controller node 210 may store a list of node identifiers. Each of the node identifiers corresponding to one of a plurality of nodes 206 registered at the controller node 210 of the first cloud network 202. In an example, the controller node 210 may store the list of node identifiers in a node registration database. The node registration database includes a collection of information relating to identification of the compute nodes 206 registered under the first cloud network 202. The controller node 210 manages non-compute services of the first cloud network 202. Although, the first cloud network 202 is shown to include one controller node, there may be more than one cloud controller in the first cloud network 202.

As shown in FIG. 2, the second cloud network 204 includes compute nodes 212-1 and 212-2, collectively also referred to as compute nodes 212. Each of the compute nodes 212 may host one VM or more than one VM. Although, the second cloud network 204 is shown to include two compute nodes there may be more than two or less than two compute nodes in the second cloud network 204. The second cloud network 204 further includes a data storage device 214. Each of the compute nodes 212 may have a respective storage volume of the data storage device 214 associated with it. Although, the second cloud network 204 is shown to include one data storage device, there may be more than one data storage devices in the second cloud network 204. The second cloud network 204 also includes a controller node 216 that can manage operations of the compute nodes 212 in the second cloud network 204. Although, the second cloud network 204 is shown to include one controller node, there may be more than one controller node in the second cloud network 204.

The multi-cloud environment 200 includes a system 218. The system 218 hosts a multi-cloud management platform 220. The system 218 may be connected to the first and second cloud networks 202 and 204 over a network, such as a private network or a public network or the internet. The multi-cloud management platform 220 can manage the first and second cloud networks 202 and 204. In an example, the multi-cloud management platform may be a hybrid cloud management solution implemented through a Software-as-a-Service (SaaS) portal. The multi-cloud management platform 220 may collect data relating to the first and cloud networks 202 and 204, and store and analyze the data for cloud management. Examples of the data relating to the first and second cloud networks 202 and 204 include cloud account details and telemetric data.

The system 218 includes a processor 102 coupled to a memory 104. The processor 102 may be implemented as microprocessors, microcomputers, microcontrollers, digital signal processors, central processing units, state machines, logic circuitries, and any devices that manipulate signals based on operational instructions. Among other capabilities, the processor 102 is configured to fetch and execute computer-readable instructions stored in the memory 104. The computer-readable instructions, also referred to as instructions, includes instructions 222. The instructions 222 may include routines, programs, components, applications, data structures, and the like, which perform particular tasks or implement particular abstract data types. The instructions, being executable by the processor(s), may also be referred to as processor-executable instructions. The execution of the instructions to perform a function may be interchangeably referred to as the instructions causing performance of the function or the instructions enabling performance of the function.

The functions of the various elements shown in the FIG. 2, including any functional blocks labeled as "processor(s)", may be provided through the use of dedicated hardware as well as hardware capable of executing software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), non-volatile storage. Other hardware, conventional and custom, may also be included.

The memory 104 may include any computer-readable medium known in the art including, for example, volatile memory (e.g., RAM), and/or non-volatile memory (e.g., EPROM, flash memory, etc.). The instruction(s) 222 include node addition instruction(s) 224 which corresponds to instructions stored on a computer-readable medium and executable by a processor to enable addition of nodes in the first and second cloud networks 202 and 204. The instruction(s) 220 also comprise other instruction(s) 226 that supplement applications on the system 218, for example, execution of functions of an operating system.

Data 228 serves, amongst other things, as a repository for storing data that may be fetched, processed, received, or generated by the instruction(s) 220. The data 228 includes management platform data 230 which stores data fetched from the multi-cloud management platform 220, where the data relates to first and second cloud networks 202 and 204 managed by the multi-cloud management platform 220. The data 228 also comprises other data 232 that may be fetched, processed, received, or generated during execution of other instruction(s) 226. Although in FIG. 2, instructions 222 and data 228 are shown to be external to the multi-cloud management platform 220, in an example, the instructions 222 and the data 228 may reside within the multi-cloud management platform 220.

Consider that a network administrator, also referred to as an admin, intends to add a node in the first cloud network 202, also referred to as cloud 202, via the multi-cloud management platform 220. Although the following description is provided with reference to addition of a single node in a single cloud network, the description is applicable mutatis mutandis for addition of multiple nodes in multiple cloud networks via a multi-cloud management platform managing the multiple cloud networks. In the present disclosure, addition of a node in a cloud network refers to configuring a node as registered under the cloud network. Physical connections between computing resources of the node and computing resources previously registered as a part of the cloud 202 are carried out prior to registering the node in the cloud 202.

In operation, the node addition instructions 224 when executed by the processor 102, cause the processor 102 to generate a list of a plurality of cloud networks managed by a multi-cloud management platform. With reference to FIG. 2, the multi-cloud management platform 220 may generate a list illustrating the first and second cloud networks 202 and 204. In an example, the list may be generated in a GUI.

In an example, the admin may select the first cloud network 202 in the list displayed in the GUI indicating that a node is to be added in the first cloud network 202. The node addition instructions 224 may cause the processor 102 to receive a node addition request at the multi-cloud management platform 220. The node addition request includes identification information of a node and a cloud network in which the node is to be added. The identification information is indicative of a functionality of the node, a network address of the node, and an identifier of the cloud network 202. In an example, the functionality of the node may be defined based on a user selection. In an example, the admin may select whether a compute node or a controller node is to be added. Based on the selection, the node may be identified.

In an example, the network address of the node may also be specified by the admin in the node addition request. In an example, the network address of the node is one of an Internet Protocol (IP) address of the node, a Media Access Control (MAC) address of the node, an IP address of a Baseboard Management Controller (BMC) of the node, and a combination thereof. The identifier of the cloud network may be a GUID of the first cloud network 202.

In response to the node addition request being received, the node addition instructions 224 when executed by the processor 102 may cause the processor 102 to check whether an Operating System (OS) is pre-installed in the node. In an example, the node addition instructions 224 may cause the processor 102 to access the BMC of the node based on the IP address of the BMC and fetch for OS files installed in the node to determine whether the OS is pre-installed in the node. In response to identifying that the OS is not pre-installed in the node, the node addition instructions 224 may cause the processor 102 to identify service provider related information of the cloud 202 based on the identifier of the cloud 202. The service provider related information includes a name of a cloud service provider of the cloud 202.

Based on the functionality of the node and the service provider related information of the cloud 202, the node addition instructions 224 when executed by the processor 102 may further cause the processor to obtain an image file of the OS. In an example, the image file of the OS may be obtained based on a user input. The node addition instructions 224 may generate a request for the admin to upload an Operating system image to be installed on the node to be added. In an example, if a controller node is to be added then the admin may upload an image of an OS supported by the cloud 202 in which the controller node is to be added. If a compute node is to be added, then the admin may upload the image of an OS on which the admin plans to setup the hypervisor and create virtual machine instances. Thus, based on the functionality of the node and the service provider information of the cloud 202, the admin may upload the image file of the OS to be installed. In another example, the image file of the OS may be obtained from a predefined image store of the multi-cloud management platform 220. The multi-cloud management platform 220 may expose an image store which stores and manages images of OS's compatible with different cloud service providers. Based on the service provider information of the cloud 202, the node addition instructions 224 may enable an OS image to be selected from the image store, such that the selected OS image is compatible with the cloud 202. In an example, the node addition instructions 224 may invoke an API hosted by the cloud 202 in which the node is to be added to install the OS on the node. Once the image file is obtained, the node addition instructions 224 cause the processor 102 to execute the image file of the OS to install the OS in the node. Thus, the OS is installed in the node based on the functionality of the node and the service provider related information of the cloud network.

In response to the OS being installed in the node, the node addition instructions 224 when executed by the processor 102 may cause the processor 102 to obtain cloud account details of the cloud 202 based on the identifier of the cloud network. In an example, the cloud account details may be obtained from the multi-cloud management platform 220. In another example, the node addition instructions 224 may request for a user input to receive the cloud account details. The cloud account details is indicative of data for authentication of a user account that controls access to computing resources of the cloud 202. In an example, the cloud account details include username and password of the cloud 202.

The node addition instructions 224 when executed by the processor 102 further cause the processor 102 to access a controller node 210 of the cloud network 202 based on the cloud account details. The controller node 202 is to manage non-compute services of the cloud network. In an example, the user name and password obtained from the cloud account details may be used to access the controller node 210. Access to the controller node 210 indicates privileges to read, write, and modify contents of a datastore, such as the node registration database, of the controller node 210. In an example, based on the service provider information of the cloud 202, an API in the cloud 202 may be invoked by the node addition instructions 224 for accessing the controller node 210.

In an example, the node addition instructions 224 when executed by the processor 102 cause the processor 102 to determine based on the functionality and the network address of the node, whether the node is operationally compatible for being registered at the controller node 210 of the cloud network 202. Operational compatibility of a node refers to capabilities of computing resources of the node to execute functions and operations of the node. In an example, there may be predefined hardware specifications for a node. If the predefined hardware specifications are not fulfilled, the node may be determined to be operationally incompatible. In another example, the OS installed in the node may be malfunctioning, thereby hampering operations of the node. Such a node may also be determined to be operationally incompatible. In response to a node being determined to be operationally incompatible, the node addition instructions 224 may cause the processor 102 to generate a message indicating that the node is not ready to be registered.

In response to determining that the node is operationally compatible for being registered at the controller node 210 of the cloud network 202, the node addition instructions 224 may cause updation of the node registration database maintained in the controller node 210. The node registration database may be updated to include a node identifier of the node which is to be added. In an example, the node identifier may be a GUID of the node. In an example, based on the functionality of the node and the service provider information of the cloud 202, the node addition instructions 224 may invoke an API of the cloud 202 to add the node identifier of the node in the node registration database of the cloud 202.

Once, the node registration database is updated, addition of the node in the first cloud network 202 may be considered to be successful. Thus, the node is registered at the controller node 210 of the first cloud network 202, based on the identification information of the node and the first cloud network 202. In response to the node being successfully registered at the controller node 210 of the first cloud network 202, the node addition instructions 224 may cause generation of an addition successful message which may be displayed to the admin.

Figure 3:
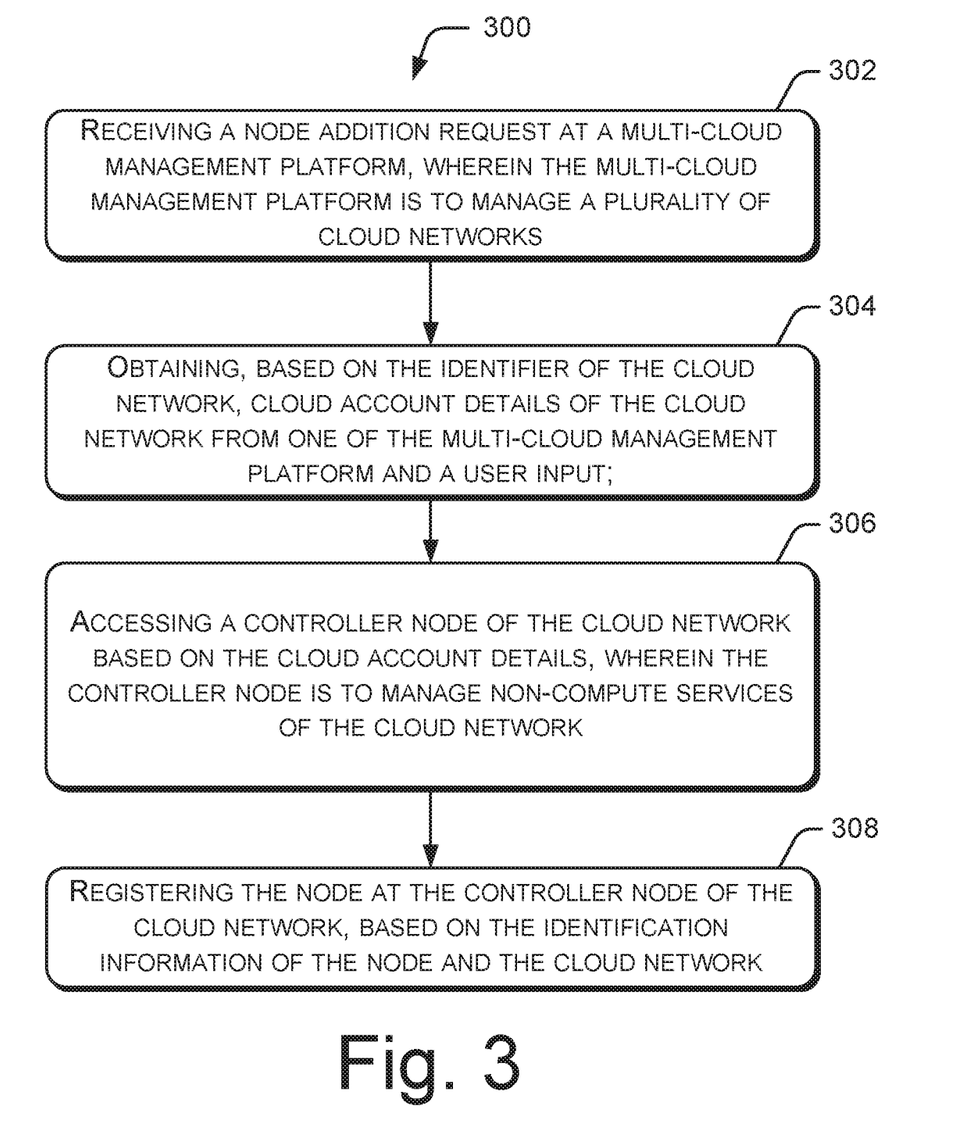
FIG. 3 illustrates a method for addition of nodes in a cloud network managed by a multi-cloud management platform, according to an example.

FIG. 3 illustrates a method 300 for addition of nodes in a cloud network managed by a multi-cloud management platform, according to an example. The method 300 enables addition of a node in a cloud network, such as the first cloud network 202, managed by a multi-cloud management platform, such as the multi-cloud management platform 220. In an example, the multi-cloud management platform may be a hybrid cloud management solution implemented through a Software-as-a-Service (SaaS) portal. The method 300 can be implemented by processing resource(s) or computing device(s) through any suitable hardware, a non-transitory machine readable medium, or combination thereof. In an example, step(s) of the method 300 may be performed by execution of computer-readable instructions, such as the node addition instructions 224 which includes instructions stored on a medium and executable by a processing resource, such as the processor 102, of a system, such as the system 100 or 218. Further, although the method 300 is described in context of the aforementioned system 100 or 218, other suitable systems may be used for execution of the method 300. It may be understood that processes involved in the method 300 can be executed based on instructions stored in a non-transitory computer-readable medium. The non-transitory computer-readable medium may include, for example, digital memories, magnetic storage media, such as a magnetic disks and magnetic tapes, hard drives, or optically readable digital data storage media.

Referring to FIG. 3, at block 302, a node addition request is received at a multi-cloud management platform, such as the multi-cloud management platform 220 of FIG. 2, from a network administrator. In an example, the node addition request may be received through a GUI or a Command Line Interface (CLI) of the multi-cloud management platform. The node addition request includes identification information of a node and a cloud network in which the node is to be added. The identification information is indicative of a functionality of the node, a network address of the node, and an identifier of the cloud network. In an example, the identification information may include a node type indicating the functionality of the node. The node type may be one of a compute node and a controller node. In an example, the admin may define the node type of the node to be added. The network address of the node may be one of an Internet Protocol (IP) address of the node, a Media Access Control (MAC) address of the node, an IP address of a Baseboard Management Controller of the node, and a combination thereof. The identifier of the cloud network may be a name, a Globally Unique Identifier (GUID), or a combination thereof.

At block 304, based on the identifier of the cloud network, cloud account details of the cloud network from one of the multi-cloud management platform and a user input. The cloud account details is indicative of data for authentication of a user account that controls access to computing resources of the cloud network. In an example, the cloud account details may include a username and password. In an example, the cloud account details may be stored in the multi-cloud management platform. In another example, the instructions when executed by the processor 102 cause the processor 102 to request for the cloud account details from the admin. An admin may provide a user input defining the cloud account details.

At block 306, a controller node of the cloud network is accessed based on the cloud account details. The controller node manages non-compute services of the cloud network. The controller node is configured to manage Application Programming Interfaces (APIs), web interfaces, schedulers, database servers, and message queues of the cloud network. At block 308, the node is registered at the controller node of the cloud network, based on the identification information of the node and the cloud network.

Figure 4A:
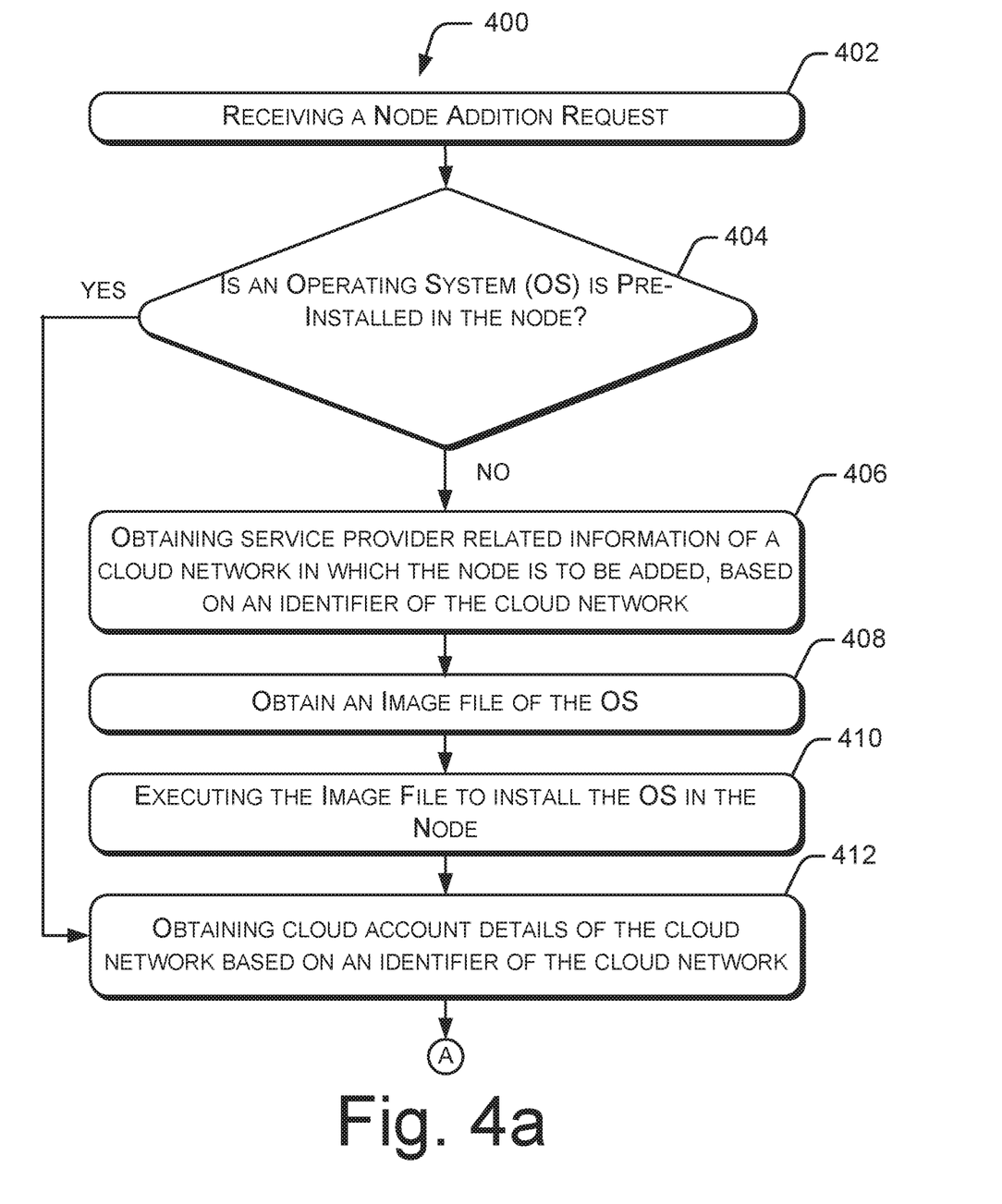
FIG. 4a illustrates a method for addition of nodes in a cloud network managed by a multi-cloud management platform, according to an example.

FIG. 4a illustrates a method for addition of nodes in a cloud network managed by a multi-cloud management platform, according to an example. The method 400 enables addition of a node in a cloud network managed by a multi-cloud management platform, such as the multi-cloud management platform 220. In an example, the multi-cloud management platform may be a hybrid cloud management solution implemented through a Software-as-a-Service (SaaS) portal. The method 400 can be implemented by processing resource(s) or computing device(s) through any suitable hardware, a non-transitory machine readable medium, or combination thereof. In an example, step(s) of the method 400 may be performed by execution of computer-readable instructions, such as the node addition instructions 224 which includes instructions stored on a medium and executable by a processing resource, such as the processor 102, of a system, such as the system 100 or 218. Further, although the method 300 is described in context of the aforementioned system 100 or 218, other suitable systems may be used for execution of the method 400. It may be understood that processes involved in the method 400 can be executed based on instructions stored in a non-transitory computer-readable medium. The non-transitory computer-readable medium may include, for example, digital memories, magnetic storage media, such as a magnetic disks and magnetic tapes, hard drives, or optically readable digital data storage media.

In an example, a list of a plurality of cloud networks managed by a multi-cloud management platform, such as the multi-cloud management platform 220, may be generated in a GUI. A user selection of a cloud network may be received, where the user selection identifies the cloud network in which a node is to be added.

At block 402, a node addition request may be received. In an example, an admin may define a functionality of the node to be added, a network address of the node, and an identifier of the cloud network in which the node is to be added. The node addition request includes identification information of a node and a cloud network in which the node is to be added. The identification information is indicative of a functionality of the node, a network address of the node, and an identifier of the cloud network 202. In an example, the functionality of the node may be defined based on a user selection. In an example, the admin may select whether a compute node or a controller node is to be added. Based on the selection, the functionality of the node may be identified.

In an example, the network address of the node may also be specified by the admin in the node addition request. In an example, the network address of the node is one of an Internet Protocol (IP) address of the node, a Media Access Control (MAC) address of the node, an IP address of a Baseboard Management Controller (BMC) of the node, and a combination thereof. The identifier of the cloud network may be a GUID of the cloud network, such as the first cloud network 202.

In response to the node addition request being received, it is checked whether an Operating System (OS) is pre-installed in the node, at block 404. In an example, the BMC of the node may be accessed based on the IP address of the BMC to check if the OS is pre-installed. In response to identifying that the OS is not pre-installed in the node ("NO" branch from block 404), service provider related information of the cloud network in which the node is to be added is obtained, based on the identifier of the cloud network, at block 406. The service provider related information includes a name of a cloud service provider of the cloud.

At block 408, an image file of the OS may be obtained, based on the functionality of the node and the service provider related information of the cloud network. In an example, the image file of the OS may be obtained based on a user input. A request for the admin to upload an Operating system image to be installed on the node may be generated. In an example, if a controller node is to be added then the admin may upload an image of an OS supported by the cloud network in which the controller node is to be added. If a compute node is to be added, then the admin may upload the image of an OS on which the admin plans to setup the hypervisor and create virtual machine instances. Thus, based on the functionality of the node and the service provider information of the cloud network, the admin may upload the image file of the OS to be installed. In another example, the image file of the OS may be obtained from a predefined image store of the multi-cloud management platform, such as the multi-cloud management platform 220. The multi-cloud management platform may expose an image store which stores and manages images of OS's compatible with different cloud service providers. Based on the service provider information of the cloud network, an OS image may be selected from the image store, such that the selected OS image is compatible with the cloud network. At block 410, once the image file is obtained, the image file of the OS may be executed to install the OS in the node. Thus, the OS is installed in the node based on the functionality of the node and the service provider related information of the cloud network.

In response to the OS being installed in the node or in response to determining that the OS is pre-installed in the node ('YES' branch from block 404), cloud account details of the cloud network may be obtained based on the identifier of the cloud network, at block 412. In an example, the cloud account details may be obtained from the multi-cloud management platform. In another example, the cloud account details may be received from a user input. The cloud account details is indicative of data for authentication of a user account that controls access to computing resources of the cloud network. In an example, the cloud account details include username and password of the cloud network.

Figure 4B:
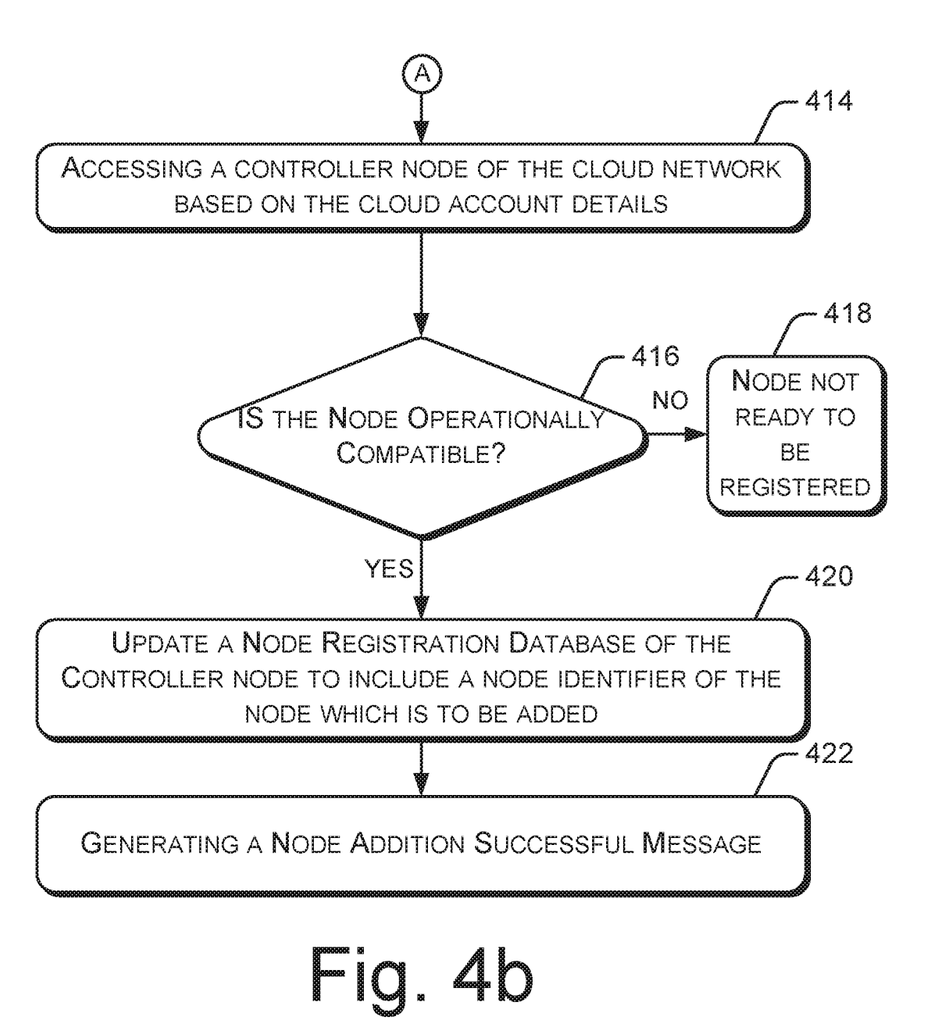
FIG. 4b illustrates further steps of the method illustrated in FIG. 4a according to an example.

With reference to FIG. 4b, At block 414, a controller node of the cloud network, such as the controller node 210 of the first cloud network 202, may be accessed based on the cloud account details. In an example, the user name and password obtained from the cloud account details may be used to access the controller node. Access to the controller node indicates privileges to read, write, and modify contents of a datastore, such as a node registration database, of the controller node.

At block 416, it is determined whether the node is operationally compatible for being registered at the controller node, based on the functionality and the network address of the node. Operational compatibility of a node refers to capabilities of computing resources of the node to execute functions and operations of the node. In an example, there may be predefined hardware specifications for a node. If the predefined hardware specifications are not fulfilled, the node may be determined to be operationally incompatible. In another example, the OS installed in the node may be malfunctioning, thereby hampering operations of the node. Such a node may also be determined to be operationally incompatible. In response to a node being determined to be operationally incompatible ('NO' branch from block 416), a message indicating that the node is not ready to be registered may be generated, at block 418.

In response to determining that the node is operationally compatible ('YES' branch from block 416) for being registered at the controller node of the cloud network, the node registration database maintained in the controller node may be updated, at block 420. The node registration database is updated to include a node identifier of the node which is to be added. In an example, the node identifier may be a GUID of the node.

Once, the node registration database is updated, addition of the node in the cloud network may be considered to be successful. Thus, the node is registered at the controller node of the cloud network, based on the identification information of the node and the cloud network. In response to the node being successfully registered at the controller node of the cloud network, a node addition successful message is generated, at block 422.

Figure 5:
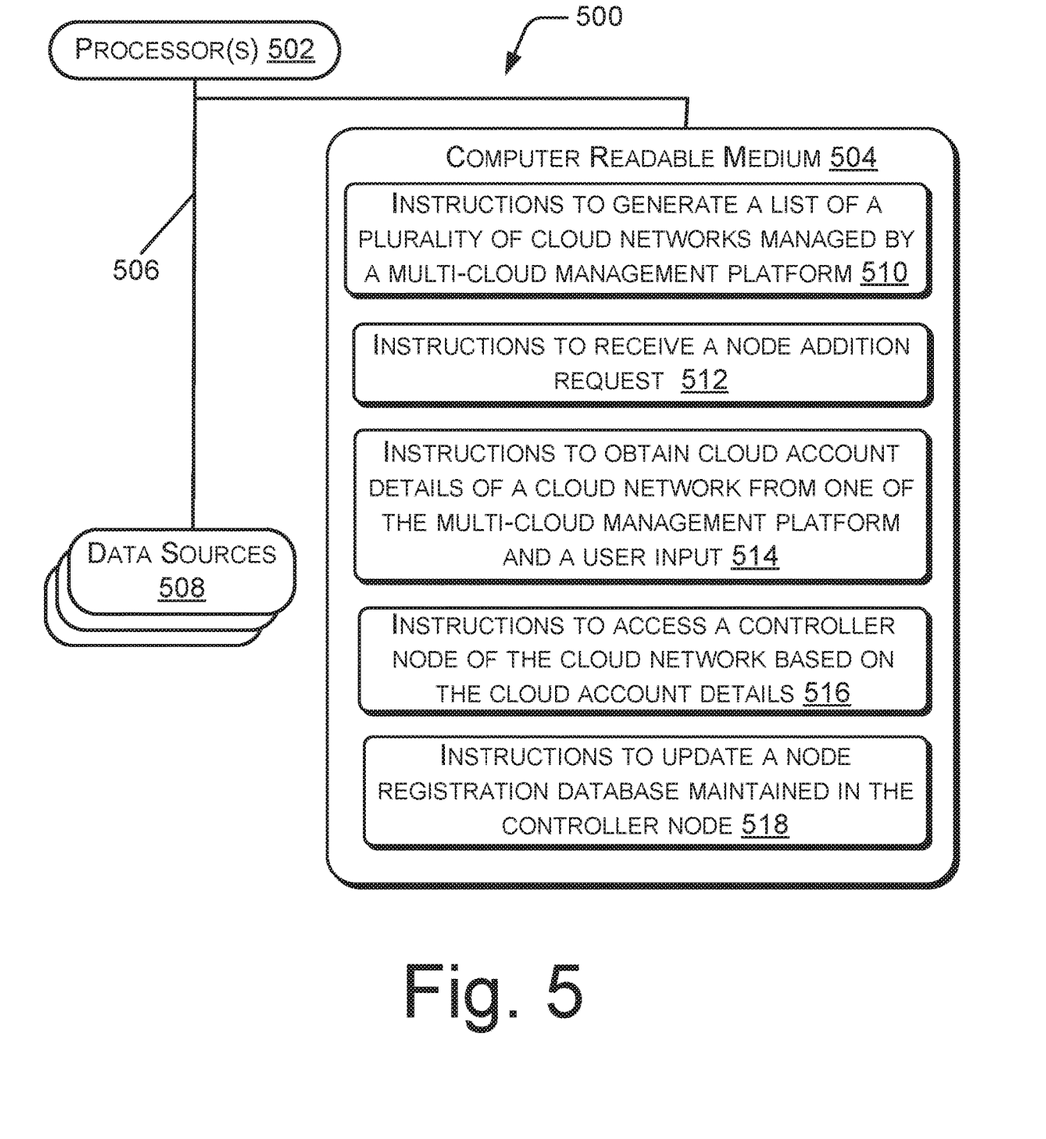
FIG. 5 illustrates a system environment implementing a non-transitory computer readable medium for addition of a node in a cloud network managed by a multi-cloud management platform, according to an example.

FIG. 5 illustrates a system environment implementing a non-transitory computer readable medium for addition of a node in a cloud network managed by a multi-cloud management platform, according to an example. In an example, the multi-cloud management platform may be a hybrid cloud management solution implemented through a Software-as-a-Service (SaaS) portal.

In an example, the system environment 500 includes processor(s) 502 communicatively coupled to a non-transitory computer readable medium 504 through a communication link 506. In an example, the system environment 500 may be a computing system, such as the system 100 or 218. In an example, the processor(s) 502 may have one or more processing resources for fetching and executing computer-readable instructions from the non-transitory computer readable medium 504.

The non-transitory computer readable medium 504 can be, for example, an internal memory device or an external memory device. In an example implementation, the communication link 506 may be a direct communication link, such as any memory read/write interface.

The processor(s) 502 and the non-transitory computer readable medium 504 may also be communicatively coupled to data sources 508 over the network. The data sources 508 can include, for example, memory of the system, such as the system 100 or 218.

In an example implementation, the non-transitory computer readable medium 504 includes a set of computer readable instructions which can be accessed by the processor(s) 502 through the communication link 506 and subsequently executed to perform acts for addition of a node in cloud network, such as the cloud network 220, via a multi-cloud management platform, such as the multi-cloud management platform 220.

Referring to FIG. 5, in an example, the non-transitory computer readable medium 504 includes instructions 510 that cause the processor(s) 502 to generate a list of a plurality of cloud networks managed by a multi-cloud management platform, such as the multi-cloud management platform 220. The non-transitory computer readable medium 504 include instructions 512 that cause the processor(s) 502 to receive a node addition request. The node addition request includes identification information of a node and a cloud network, in which the node is to be added. The identification information is indicative of a functionality of the node, a network address of the node, and an identifier of the cloud network. In an example, the network address of the node is one of an Internet Protocol (IP) address of the node, a Media Access Control (MAC) address of the node, an IP address of a Baseboard Management Controller of the node, and a combination thereof. The node identifier may be a GUID of the node.

In an example, the non-transitory computer readable medium 504 includes instructions, when executed by the processor, cause the processor(s) 502 to check whether an Operating System (OS) is pre-installed in the node, in response to receiving the node addition request. The non-transitory computer readable medium 504 includes instructions that cause the processor(s) 502 to install the OS in the node based on the identification information of the node and the cloud network, in response to identifying that the OS is not pre-installed in the node. In an example, the non-transitory computer readable medium 504 includes instructions that cause the processor(s) 502 to identify service provider related information of the cloud network, based on the identifier of the cloud network. Further, the non-transitory computer readable medium 504 may include instructions that cause the processor(s) 502 to obtain, based on the functionality of the node and the service provider related information of the cloud network, an image file of the OS from one of a user input and a predefined image store of the multi-cloud management platform. The non-transitory computer readable medium 504 may include instructions that cause the processor(s) 502 to execute the image file of the OS to install the OS in the node.

Further, the non-transitory computer readable medium 504 includes instructions 514 that cause the processor(s) 502 to obtain, based on the identifier of the cloud network, cloud account details of the cloud network from one of the multi-cloud management platform and a user input. The cloud account details is indicative of data for authentication of a user account that controls access to computing resources of the cloud network.

In an example, the non-transitory computer readable medium 504 may include instructions 516 that cause the processor(s) 502 to access a controller node of the cloud network based on the cloud account details. The controller node is to manage non-compute services of the cloud network. In an example, the controller node is to manage Application Programming Interfaces (APIs), web interfaces, schedulers, database servers, and message queues of the cloud network. In an example, the non-transitory computer readable medium 504 may include instructions that cause the processor(s) 502 to determine, based on the functionality and the network address of the node, whether the node is operationally compatible for being registered at the controller node of the cloud network.

Further, the non-transitory computer readable medium 504 may include instructions 518 that cause the processor(s) 502 to update a node registration database maintained in the controller node, in response to determining that the node is operationally compatible for being registered under the controller node of the cloud network. The node registration database is updated to include a node identifier of the node. The node registration database is to store a list of node identifiers, each corresponding to one of a plurality of nodes registered at the controller node of the cloud network. In an example, the non-transitory computer readable medium 504 includes instructions that cause the processor(s) 502 to generate an addition successful message, in response to the node being successfully registered at the controller node of the cloud network.

Although implementations of present subject matter have been described in language specific to structural features and/or methods, it is to be noted that the present subject matter is not necessarily limited to the specific features or methods described. Rather, the specific features and methods are disclosed and explained in the context of a few implementations for the present subject matter.

I claim:

1. A method for addition of nodes in cloud networks, comprising:

receiving from an administrative user a node addition request at a multi-cloud management platform, wherein the multi-cloud management platform is to manage a plurality of cloud networks, wherein each particular cloud network of the plurality of cloud networks includes a controller node that maintains a node registration database containing information regarding nodes that are registered with the particular cloud network, the node addition request including identification information of a node and a cloud network, amongst the plurality of cloud networks, in which the node is to be added, the identification information being indicative of a functionality of the node, a network address of the node, and an identifier of the cloud network that uniquely identifies the cloud network; and responsive to the node addition request, registering the node within the node registration database of the controller node of the cloud network by:

obtaining, based on the identifier of the cloud network, cloud account details of the cloud network from one of the multi-cloud management platform and a user input, the cloud account details indicative of data for authentication of a user account of the administrative user that controls access to computing resources of the cloud network; and programmatically accessing the controller node of the cloud network based on the cloud account details, wherein the controller node is to manage non-compute services of the cloud network including Application Programming Interfaces (APIs), web interfaces, schedulers, database servers, or message queues of the cloud network.

2. The method as claimed in claim 1, wherein said registering further comprises:

determining, based on the functionality and the network address of the node, whether the node is operationally compatible for being registered at the controller node of the cloud network; and in response to determining that the node is operationally compatible for being registered at the controller node of the cloud network, updating the node registration database to include a node identifier of the node.

3. The method as claimed in claim 1, further comprising:

in response to receiving the node addition request, checking whether an Operating System (OS) is pre-installed in the node; and installing the OS in the node based on the identification information of the node and the cloud network, in response to identifying that the OS is not pre-installed in the node.

4. The method as claimed in claim 3, wherein installing the OS comprises:

identifying service provider related information of the cloud network based on the identifier of the cloud network;

obtaining, based on the functionality of the node and the service provider related information of the cloud network, an image file of the OS from one of a user input and a predefined image store of the multi-cloud management platform; and executing the image file of the OS to install the OS in the node.

5. The method as claimed in claim 1, further comprising, generating an addition successful message, in response to the node being successfully registered at the controller node of the cloud network.

6. The method as claimed in claim 1, wherein the network address of the node is one of an Internet Protocol (IP) address of the node, a Media Access Control (MAC) address of the node, an IP address of a Baseboard Management Controller of the node, and a combination thereof.

7. A system for addition of nodes in cloud networks, comprising:

a processor; and a memory coupled to the processor, the memory storing instructions executable by the processor to:

generate a list of a plurality of cloud networks managed by a multi-cloud management platform, wherein each particular cloud network of the plurality of cloud networks includes a controller node that maintains a node registration database containing information regarding nodes that are registered with the particular cloud network;

receive from an administrative user a node addition request at the multi-cloud management platform, the node addition request including identification information of a node and a cloud network, amongst the plurality of cloud networks, in which the node is to be added, the identification information being indicative of a functionality of the node, a network address of the node, and an identifier of the cloud network that uniquely identifies the cloud network;

install an Operating System (OS) in the node based on the identification information of the node and the cloud network, in response to identifying that the OS is not pre-installed in the node; and responsive to the node addition request, register the node within the node registration database of the controller node of the cloud network by:

obtaining, based on the identifier of the cloud network, cloud account details of the cloud network from one of the multi-cloud management platform and a user input, the cloud account details indicative of data for authentication of a user account of the administrative user that controls access to computing resources of the cloud network; and programmatically accessing the controller node of the cloud network based on the cloud account details, wherein the controller node is to manage non-compute services of the cloud network including Application Programming Interfaces (APIs), web interfaces, schedulers, database servers, or message queues of the cloud network.

8. The system as claimed in claim 7, wherein the instructions are further executable by the processor to:

determine, based on the functionality and the network address of the node, whether the node is operationally compatible for being registered at the controller node of the cloud network; and in response to determining that the node is operationally compatible for being registered at the controller node of the cloud network, update the node registration database to include a node identifier of the node.

9. The system as claimed in claim 7, wherein the instructions are further executable by the processor to:

identify service provider related information of the cloud network based on the identifier of the cloud network;

obtain, based on the functionality of the node and the service provider related information of the cloud network, an image file of the OS from one of a user input and a predefined image store of the multi-cloud management platform; and execute the image file of the OS to install the OS in the node.

10. The system as claimed in claim 7, wherein the instructions are further executable by the processor to, generate an addition successful message, in response to the node being successfully registered at the controller node of the cloud network.

11. The system as claimed in claim 7, wherein the network address of the node is one of an Internet Protocol (IP) address of the node, a Media Access Control (MAC) address of the node, an IP address of a Baseboard Management Controller of the node, and a combination thereof.

12. A non-transitory computer-readable medium comprising computer-readable instructions for addition of nodes in cloud networks, the computer-readable instructions when executed by a processor, cause the processor to:

generate a list of a plurality of cloud networks managed by a multi-cloud management platform, wherein each particular cloud network of the plurality of cloud networks includes a controller node that maintains a node registration database containing information regarding nodes that are registered with the particular cloud network;

receive from an administrative user a node addition request including identification information of a node and a cloud network, amongst the plurality of cloud networks, in which the node is to be added, the identification information being indicative of a functionality of the node, a network address of the node, and an identifier of the cloud network that uniquely identifies the cloud network;

responsive to the node addition request, register the node within the node registration database of the controller node of the cloud network by:

obtaining, based on the identifier of the cloud network, cloud account details of the cloud network from one of the multi-cloud management platform and a user input, the cloud account details indicative of data for authentication of a user account of the administrative user that controls access to computing resources of the cloud network; and programmatically accessing the controller node of the cloud network based on the cloud account details, wherein the controller node is to manage non-compute services of the cloud network including Application Programming Interfaces (APIs), web interfaces, schedulers, database servers, or message queues of the cloud network.

13. The non-transitory computer-readable medium as claimed in claim 12, wherein the computer-readable instructions when executed by the processor, further cause the processor to:

determine, based on the functionality and the network address of the node, whether the node is operationally compatible for being registered within the node registration database of the controller node of the cloud network.

14. The non-transitory computer-readable medium as claimed in claim 12, wherein the computer-readable instructions when executed by the processor, further cause the processor to:

check whether an Operating System (OS) is pre-installed in the node, in response to receiving the node addition request; and install the OS in the node based on the identification information of the node and the cloud network, in response to identifying that the OS is not pre-installed in the node.

15. The non-transitory computer-readable medium as claimed in claim 14, wherein the computer-readable instructions to install the OS in the node, when executed by the processor, further cause the processor to:

identify service provider related information of the cloud network based on the identifier of the cloud network;

obtain, based on the functionality of the node and the service provider related information of the cloud network, an image file of the OS from one of a user input and a predefined image store of the multi-cloud management platform; and execute the image file of the OS to install the OS in the node.

16. The non-transitory computer-readable medium as claimed in claim 12, wherein the computer-readable instructions, when executed by the processor, further cause the processor to generate an addition successful message, in response to the node being successfully registered at the controller node of the cloud network.

17. The non-transitory computer-readable medium as claimed in claim 12, wherein the network address of the node is one of an Internet Protocol (IP) address of the node, a Media Access Control (MAC) address of the node, an IP address of a Baseboard Management Controller of the node, and a combination thereof.

* * * * *